Patented Mar. 4, 1930

1,749,575

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF DISINFECTING SEEDS AND COMPOSITION THEREFOR

No Drawing.  Application filed October 29, 1926. Serial No. 145,099.

This invention relates to a process of disinfecting seeds against smut and other diseases, and more particularly to the use of new compounds containing basic copper salts which are either acid in reaction or contain added material of an acid nature.

In more recent years attempts have been made to combat certain smut diseases of cereal crops by the use of copper carbonate, which is applied in the form of a dust and is added at the rate of 2 to 4 ounces of the compound to each bushel of the seed. The results of such treatment are not uniform, and a complete control of the disease is very seldom effected. Generally, the new crop which is harvested from wheat treated with copper carbonate in this way contains from 0.5 to 2 per cent or more of smut.

This invention has as an object the control of smut disease of cereal crops. A further object is to maintain some acidity in the environment of the seed during the germination period.

These objects are accomplished by the following invention in which I have found that the efficiency of copper carbonate, or other basic salt, for example, basic copper sulfate, basic copper nitrate, basic copper acetate, and like substances can be very greatly improved in their use as fungicides by combining with them a material yielding a certain amount of acidity or otherwise producing acidity in such salts. This may be done by mixing the copper salts with a derivative of an acid material, or material of an acid nature, for example, salts of acid reactions, such as copper sulfate, zinc chloride, ferrous sulfate or sodium acid sulfate, sodium acid oxalate, calcium acid phosphate, or the like substances, or free organic or inorganic acids, for instance, phosphoric acid, boric acid, benzoic acid, benzol sulfonic acid, oxalic or tartaric acid, or the like.

These new compounds may be mixed with any of the inert materials commonly used for applying disinfecting material. I have found, for instance, that clay, calcium sulfate, charcoal, infusorial earth, or similar materials are suitable for this purpose. Products which are diluted with the inert material in a chemical process, for instance, by forming the basic salt in the presence of the inert material may be used.

Since it is proposed to apply these compounds as dusts, it is, of course, advisable to reduce them to a very fine powder. The following examples indicate by way of illustration how my invention may be carried out:

Example 1

100 parts of basic copper nitrate are mixed with 10 parts of copper sulfate and ground for a period of 2 hours.

Example 2

100 parts of copper carbonate are thoroughly mixed with 3 parts of powder benzoic acid.

Example 3

100 parts of a prepared basic copper sulfate mixed with 10 parts of calcium acid phosphate are ground in a ball mill for 3 hours.

The prepared basic copper sulfate is made as follows:

100 parts of copper sulfate is dissolved in 300 parts of boiling water and 50 parts of tolanite is added. Magnesium oxide is put in until the solution is free of copper (about 13.5 parts of magnesium oxide is needed). The precipitate is filtered off and dried.

Example 4

130 parts of dehydrated copper sulfate, 20 parts of magnesium oxide and 50 parts of bentonite (a colloidal clay) are mixed and finely ground to pass a 200 mesh screen.

I have also found that it is not necessary to use the already prepared basic copper salt, but that a mixture of a normal copper salt with an alkaline substance may also be used, such as, for example, the hydroxides and carbonates of magnesium, calcium and sodium, although in most instances I prefer to use magnesium oxide given in Example 4 above. In such case it is necessary that the alkaline compound be added to an amount less than the theoretical. Such a mixture, if dusted on the seed and exposed to wet soil, forms the basic salt and the excess of the normal copper salt remains unchanged to produce the necessary acidity. In this case it is not advisable to add more of an acid compound, since such additional amount would only necessitate the use of an increased amount of an alkaline substance.

As many apparently widely different embodiments of this invention may be made without departing from the spirit thereof, it is to be understood that I do not limit myself to the foregoing examples or description except as indicated in the following patent claims.

I claim:

1. A seed disinfectant, comprising a normal copper salt, and an alkaline substance insufficient in amount to convert the copper salt entirely to the basic salt.

2. A dust disinfectant for seeds, comprising a normal copper salt, and magnesium oxide, the amount of the latter being insufficient to convert the copper salt entirely to the basic salt.

3. A seed disinfectant, comprising copper sulfate, and an alkaline substance insufficient in amount to convert the copper sulfate entirely to the insoluble basic sulfate.

4. A dust disinfectant for seeds, comprising copper sulfate, and magnesium oxide, the amount of the latter being insufficient to convert the copper sulfate entirely to the insoluble basic sulfate.

5. A process for the treatment of seeds for the control of disease, which comprises treating the seeds with a mixture of a normal copper salt and an alkaline substance insufficient in amount to convert the copper salt entirely to the basic salt.

6. A process for the treatment of seeds for the control of disease, which comprises treating the seeds with a dry, finely powdered mixture of a normal copper salt and magnesium oxide, the amount of the latter being insufficient to convert the copper salt entirely to the basic salt.

7. A process for the disinfection of seeds, which comprises treating the seeds with a mixture of copper sulfate and an alkaline substance insufficient in amount to convert the copper sulfate entirely to the insoluble basic sulfate.

8. A process for the disinfection of seeds, which comprises treating the seeds with a dry, finely powdered mixture of copper sulfate and magnesium oxide, the amount of the latter being insufficient to convert the copper sulfate entirely to the insoluble basic sulfate.

In testimony whereof I affix my signature.

MAX ENGELMANN.